United States Patent Office 2,717,895
Patented Sept. 13, 1955

2,717,895

GAMMA-HYDROXY-TERTIARY AMINES

James M. Sprague, Drexel Hill, and Everett M. Schultz, Glenolden, Pa., assignors to Merck & Co., Inc., a corporation of New Jersey No Drawing. Application June 5, 1951, Serial No. 230,091

6 Claims. (Cl. 260—247.7)

This invention is concerned with certain new chemical compounds. It is more particularly concerned with gamma-hydroxy-tertiary amines containing as a substituent on the carbon atom to which the hydroxy substituent is attached an arylmethyl group containing one substituent in the alpha position of the aryl methyl group. The new chemical compounds embraced by this invention can be represented by the general formula,

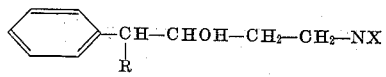

in which R is chosen from the group consisting of lower alkyl, cycloalkyl, benzyl and phenyl and NX is chosen from the class consisting of di-loweralkylamino, 1-piperidyl and 4-morpholinyl.

The gamma-hydroxy-tertiary amines of this invention are obtained by reduction of an appropriate gamma-keto-tertiary amine, the preparation of which is described in U. S. patent application Serial No. 151,044, filed March 21, 1950, of which this application is in part a continuation.

The hydrogenation of these gamma-keto-tertiary amine hydrochlorides is carried out in the presence of platinum as a catalyst and in either alcoholic or aqueous solution. The platinum catalyst can be Adams' platinum catalyst or 5% platinum on alumina.

The compounds of this invention are useful for their anticholinergic properties. In those instances in which R in the general formula is lower alkyl, it has been found that where R is an alkyl radical containing either 2 or 3 carbon atoms the compounds exhibit particular activity. Especially useful are those compounds in which R is either n-propyl or isopropyl. When R is cycloalkyl, cyclohexyl is preferred. The preferred compounds of the invention are:

1-phenyl-1-n-propyl-4-dimethylamino-2-butanol hydrochloride 1-phenyl-1-isopropyl-4-(1-piperidyl)-2-butanoal hydrochloride 1-phenyl-1-isopropyl-4-dimethylamino-2-butanol hydrochloride 1-phenyl-1-cyclohexyl-4-dimethylamino-2-butanol hydrochloride 1-phenyl-1-ethyl-4-dimethylamino-2-butanol hydrochloride The invention is illustrated by the following examples:

Example 1.—1-phenyl-1-ethyl-4-dimethylamino-2-butanol hydrochloride.—1-phenyl-1-ethyl-4-dimethylamino-2-butanone hydrochloride (10 grams, 0.0392 mole) was dissolved in 100 ml. of 3A alcohol (5 parts pure methanol and 100 parts of 190 proof ethanol). To this solution was added 0.2 gram of Adams' platinum oxide catalyst and 2 ml. of 0.1 mole ferric sulfate. Upon shaking in an atmosphere of hydrogen at atmospheric pressure, 0.0422 mole of hydrogen was absorbed in 7 hours. After removal of the catalyst by filtration, the alcohol was evaporated by vacuum distillation. The residue, a pink solid, was triturated with ether, collected by filtration and dried in air at 40°, yield 8.9 grams. After crystallization from 75 ml. of acetone there remained 5.5 grams of white tiny needles, 1-phenyl-1-ethyl-4-dimethylamino-2-butanol hydrochloride, M. P. 119–120°. Another recrystallization from acetone yielded a product melting at 142–143° and this melting point was unchanged by further crystallizations.

Example 2.—1,1-diphenyl-1methyl-4-dimethylamino-2-butanol hydrochloride.—1,1-diphenyl-1-methyl-4-dimethylamino-2-butanone hydrochloride (33.5 grams) was dissolved in 150 ml. of ethanol. To this was added 0.4 gram of Adams' platinum oxide catalyst and the solution containing the catalyst was shaken under an atmosphere of hydrogen at a pressure of one atmosphere and at a temperature of 30° C. for 26 hours. The platinum oxide was removed by filtration and the ethanol was evaporated. The residue was dissolved in water and a small amount of insoluble oil was extracted with ether. The aqueous solution then was made basic with sodium hydroxide solution and the liberated amine taken up in ether. The ether solution was dried over potassium carbonate. To the dried ether solution, alcoholic hydrogen chloride was added until the hydrochloride salt of the desired product was completely precipitated. The salt was separated and recrystallized from isopropyl alcohol giving 14.5 grams of 1,1-diphenyl-1-methyl-4-dimethylamino-2-butanol hydrochloride, M. P. 174–175 °C.

Example 3.—1-phenyl-1-isopropyl-4-(1-piperidyl)-2-butanol hydrochloride.—1-phenyl-1-isopropyl-4-(1-piperidyl)-2-butanone hydrochloride (18.6 grams, 0.06 mole) was dissolved in 500 ml. water. To this was added 1.0 gram of Adams' platinum oxide catalyst and the solution containing the catalyst was shaken under an atmosphere of hydrogen at a pressure of 1 atmosphere and a temperature of approximately 25° C. for about 12 hours. The platinum oxide catalyst was removed by filtration and the filtrate made basic with 5% sodium hydroxide. The oil that separated was taken up in 200 ml. ether and the ethereal layer washed twice with 50 ml. portions of water and then dried over potassium carbonate. The potassium carbonate was removed by filtration and the amine hydrochloride was precipitated by the addition of 3 N. alcoholic hydrogen chloride. The precipitate was separated by filtration, washed with a small quantity of ether, and dried. The precipitate was recrystallized from acetone and there was obtained 1-phenyl-1-isopropyl-4-(1-piperidyl)-2-butanol hydrochloride, M. P. 140–2° C.

Example 4.—Preparation of 1-phenyl-1-isopropyl-4-dimethylamino-2-butanol hydrochloride.—1-phenyl-1-isopropyl-4-dimethylamino-2-butanone hydrochloride (23.0 grams, 0.09 mole) was dissolved in 125 ml. water. To this was added 1.0 gram of Adams' platinum oxide catalyst and the solution containing the catalyst was shaken under an atmosphere of hydrogen at a pressure of one atmosphere and at a temperature of approximately 25° C. After approximately six hours uptake of hydrogen ceased and as the calculated amount of hydrogen had not been absorbed, the catalyst was removed by filtration and there was added 0.8 gram platinum oxide catalyst and the shaking under the atmosphere of hydrogen continued as before until uptake of hydrogen ceased. Thereupon the catalyst was removed by filtration and there was added another 0.8 gram portion of fresh catalyst and shaking under the atmosphere of hydrogen again resumed. After 23 hours' total shaking under hydrogen and addition of catalyst upon cessation of absorption of hydrogen, the reaction was completed. The catalyst was removed by filtration, the insoluble oil was taken up in 50 ml. ether and the ethereal layer separated and discarded. The aqueous solution was made basic with 20% sodium hydroxide and the amine that was liberated was taken up in 200 ml. ether. The ethereal layer was washed twice with 50 ml. portions of water, and dried over potassium carbonate. The potassium carbonate was removed by filtration and the amine hydrochloride was precipitated by the addition of 3 N. alcoholic hydrogen chloride. The precipitate was separated by filtration and recrystallized from a mixture of ethyl acetate and isopropyl alcohol.

After several crystallizations there was obtained the desired product, 1-phenyl-1-isopropyl-4-dimethylamino-2-butanol hydrochloride, M. P. 139.5–142.5° C.

The above examples are illustrative of the methods of reducing the gamma-keto-tertiary amines to the carbinols and further examples of the preparation of carbinols are not included to avoid repetitious material.

One or more of the foregoing procedures are applicable to produce the compounds of the invention which are illustrated by such compounds as:

1 - phenyl - 1 - methyl - 4 - dimethylamino - 2 - butanol hydrochloride
1 - phenyl - 1 - methyl - 4 - (1 - piperidyl) - 2 - butanol hydrochloride
1 - phenyl - 1 - ethyl - 4 - dimethylamino - 2 - butanol hydrochloride
1 - phenyl - 1 - ethyl - 4 - (4 - morpholinyl) - 2 - butanol hydrochloride
1 - phenyl - 1 - ethyl - 4 - (1 - piperidyl) - 2 - butanol hydrochloride
1 - phenyl - 1 - isopropyl - 4 - dimethylamino - 2 - butanol hydrochloride
1 - phenyl - 1 - isopropyl - 4 - (1 - piperidyl) - 2 - butanol hydrochloride
1 - phenyl - 1 - n - propyl - 4 (4 - morpholinyl) - 2 - butanol hydrochloride
1 - phenyl - 1 - n - propyl- 4 -dimethylamino - 2 - butanol hydrochloride
1 - phenyl - 1 - n - propyl - 4 - (1 - piperidyl) - 2 - butanol hydrochloride
1 - phenyl - 1 - cyclohexyl - 4 - dimethylamino - 2 - butanol hydrochloride
1 - phenyl - 1 - n - butyl -4 - dimethylamino - 2 - butanol hydrochloride
1 - phenyl - 1 - lauryl - 4 - dimethylamino - 2 - butanol hydrochloride
1 - phenyl - 1 benzyl - 4 - dimethylamino - 2 butanol hydrochloride
1 - phenyl - 1 benzyl - 4 - (1 - piperidyl) - 2 - butanol hydrochloride
1,1 - diphenyl - 4 - dimethylamino - 2 butanol hydrochloride
1,1 - diphenyl - 4 - diethylamino - 2 - butanol hydrochloride
1,1 - diphenyl - 4 - (1 - piperidyl) - 2 - butanol hydrochloride It will be realized that the radicals represented by R and NX in the general formula and occurring in the foregoing compounds can be replaced by the other radicals represented by a particular symbol to give a variety of compounds other than those specifically enumerated above and it is intended that these be included within the present disclosure.

*Example 5.—Preparation of 1,1 - diphenyl - 4 - (1 - piperidyl) - 2 - butanol.* — 1,1 - diphenyl - 4 - (1 - piperidyl)-2-butanol hydrochloride (obtained by a procedure similar to that outlined in Example 2) (34.6 grams, 0.1 mole) was dissolved in 200 ml. water. This solution was made basic with 20% sodium hydroxide solution. The free amine was taken up in 150 ml. ether. This ether solution was washed with two 50 ml. portions of water and dried over potassium carbonate. The potassium carbonate was removed by filtration and the filtrate concentrated to approximately ⅓ its original volume by evaporation of the ether. The solution was then cooled to 0° C. whereupon crystalline, free amine separated. The crystals were separated from the cold solution by filtration and recrystallized from 250 ml. petroleum ether. There was obtained 23.5 grams (76%) of 1,1-diphenyl-4-(1-diperidyl)-2-butanol, M. P. 78–79° C. (uncorrected).

The above outlined procedure to obtain the free amine from the hydrochloride is applicable to any of the hydrochloride salts of the compounds of this invention. Of course, in those instances in which the free amine is liquid rather than crystalline, it is conveniently isolated from the ether solution (from which the drying agent potassium carbonate has been removed) by simple evaporation of the ether.

Other examples of the isolation of the free amines of the compounds of this invention are not included because to do so would be repetitious as the above outlined procedure is applicable to any of the compounds of this invention.

The foregoing examples are illustrative, but not restrictive, of the scope of this invention.

What is claimed is:

1. A compound chosen from the class consisting of compounds of the formula

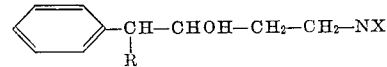

in which R is chosen from the group consisting of lower alkyl, mono-nuclear cycloalkyl, benzyl and phenyl and NX is chosen from the group consisting of di-loweralkylamino, 1-piperidyl and 4-morpholinyl and their non-toxic acid salts.

2. 1 - phenyl - 1 - n - propyl - 4 - dimethylamino - 2 - butanol hydrochloride.

3. 1-phenyl-1-isopropyl-4-(1-piperidyl)-2-butanol hydrochloride 4. 1-phenyl-1-isopropyl-4-dimethylamino-2-butanol hydrochloride 5. 1 - phenyl - 1 - cyclohexyl - 4 - dimethylamino - 2 - butanol hydrochloride 6. 1-phenyl-1-ethyl-4-dimethylamino-2-butanol hydrochloride.

References Cited in the file of this patent

UNITED STATES PATENTS 829,374     Forneau _____ Aug. 21, 1906

FOREIGN PATENTS 265,665     Switzerland _____ Apr. 1, 1950

OTHER REFERENCES

Ruddy: Abstract of Paper, 110 meeting A. C. S., September 1946, pp. 14K–16K.

Lutz et al.: J. Org. Chem., vol. 12, 1947, p. 768.

Adamson: J. Chem. Soc. (London), May 1949, part E, pp. S144–S155.

Cunningham: J. Pharm. and Exp. Therap., June 1949, pp. 151–165.